(12) United States Patent
Kim

(10) Patent No.: US 6,753,274 B2
(45) Date of Patent: Jun. 22, 2004

(54) STABPROOF AND BULLETPROOF PANEL

(75) Inventor: Jong-Ok Kim, Seoul (KR)

(73) Assignee: Pyro Industries Inc., Kyounggi-Do (KR)

( * ) Notice: Subject to any disclaimer, the term of this patent is extended or adjusted under 35 U.S.C. 154(b) by 6 days.

(21) Appl. No.: 09/975,397

(22) Filed: Oct. 10, 2001

(65) Prior Publication Data

US 2002/0173210 A1 Nov. 21, 2002

(30) Foreign Application Priority Data

Mar. 10, 2001 (KR) ......................................... 2001-12481

(51) Int. Cl.[7] .......................... B32B 5/26; B32B 27/12
(52) U.S. Cl. ............................ 442/38; 442/41; 442/43; 442/44; 442/49; 442/134; 442/135; 442/169; 442/239; 442/246; 442/255; 442/261; 442/267; 442/286; 442/290; 442/324; 442/325; 442/326; 428/911
(58) Field of Search ........................ 428/911; 442/38, 442/41, 43, 44, 49, 134, 135, 169, 239, 246, 255, 261, 267, 286, 290, 324, 325, 326

(56) References Cited

U.S. PATENT DOCUMENTS 5,362,527 A * 11/1994 Harpell et al. ................ 428/33

FOREIGN PATENT DOCUMENTS

| KR | 1987-6717 | 5/1987 | ............. F41H/1/02 |
| KR | 1989-17404 | 11/1989 | ............. F41H/1/02 |
| KR | 1999-7174 | 3/1999 | ............. F41H/1/02 |

* cited by examiner

Primary Examiner—Ula C. Ruddock
(74) Attorney, Agent, or Firm—Nawrocki, Rooney & Sivertson, P.A.

(57) ABSTRACT

Disclosed herein is a stabproof and bulletproof panel. The stabproof and bulletproof panel includes a bulletproof panel 40 and a plurality of stabproof panels 60. The bulletproof panel 40 is comprised of a front plate 45, a plurality of high density polyethylene films 44 stacked with one on top of another for dispersing impact energy, and a rear plate 46 formed by sewing together a plurality of aromatic polyamide woven fabrics for minimizing frictional heat and deformation. The front plate 45 consists of a plurality of aromatic polyamide woven fabrics 41, a felt 50 formed by forcibly inserting thin aromatic polyamide fibers or high density polyethylene fibers 52 and a shock-absorbing member 51 into a scrim woven in the form of a net using aromatic polyamide fibers or high density polyethylene yarn, and a plurality of aromatic polyamide woven fabrics 43. The stabproof panels 60 are brought into tight contact with the front surface of the bulletproof panel 40.

3 Claims, 5 Drawing Sheets

[ FIG.1 ]
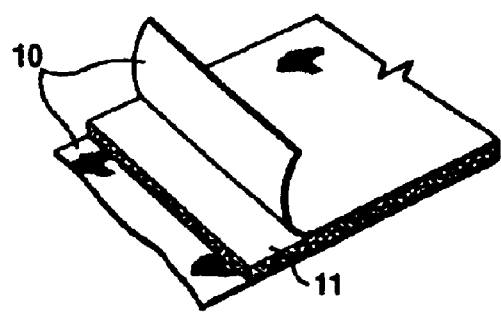
[ FIG.2 ]
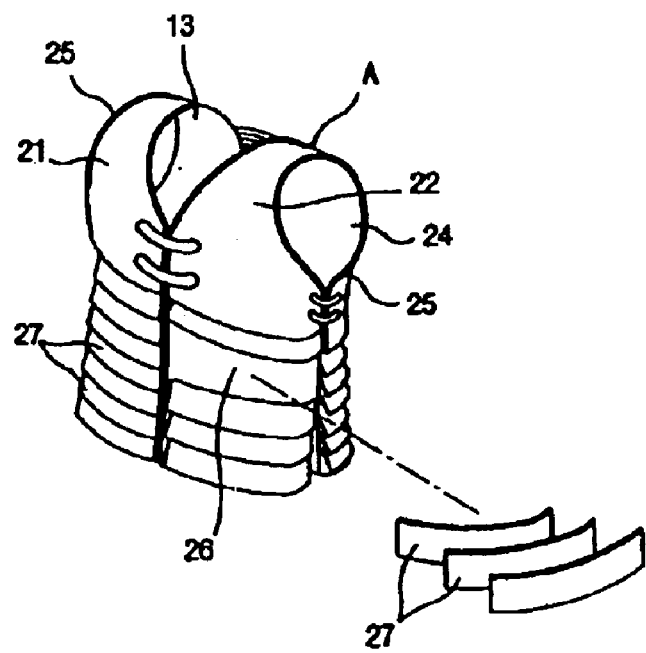

[ FIG.3 ]
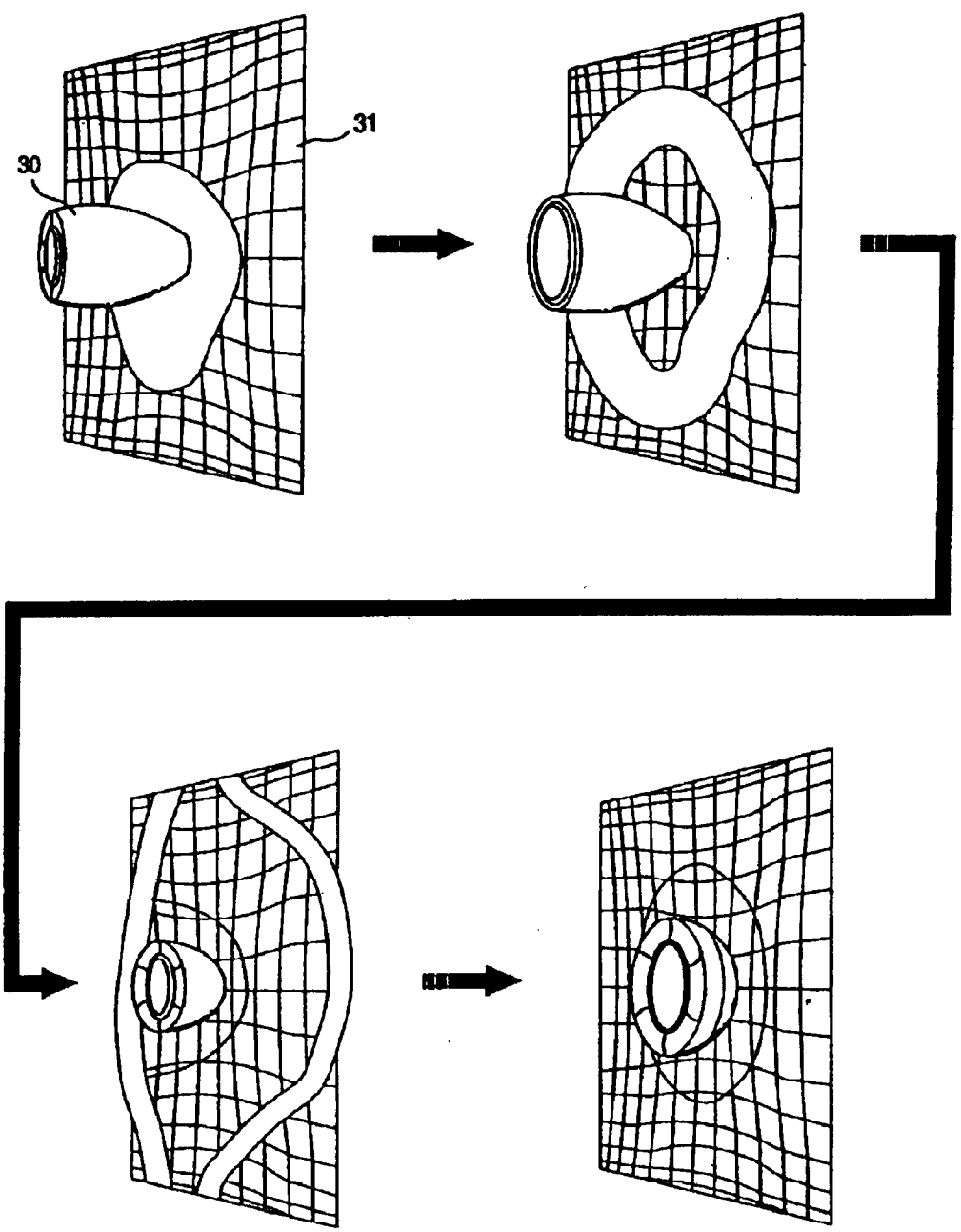

[ FIG.4 ]
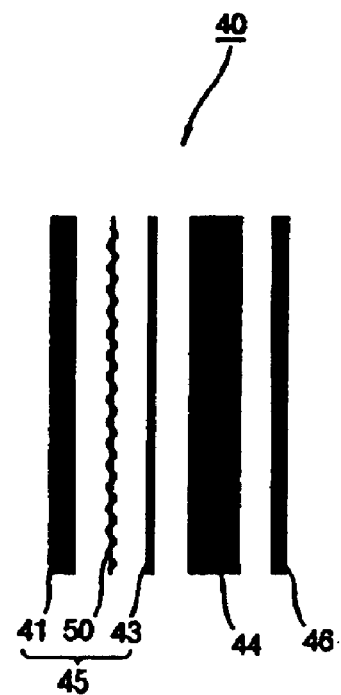
[ FIG.5 ]
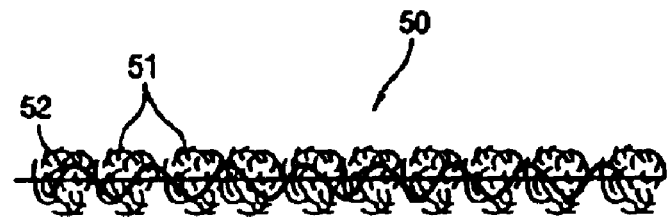

[ FIG.6 ]
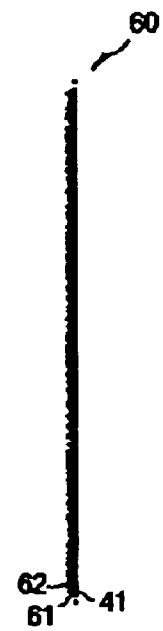
[ FIG.7 ]
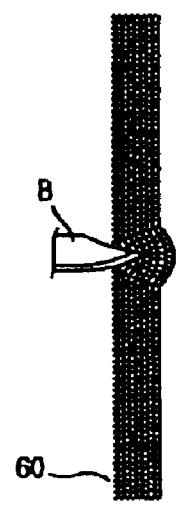

[ FIG.8 ]
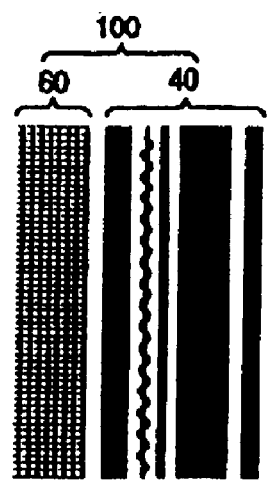
[ FIG.9 ]
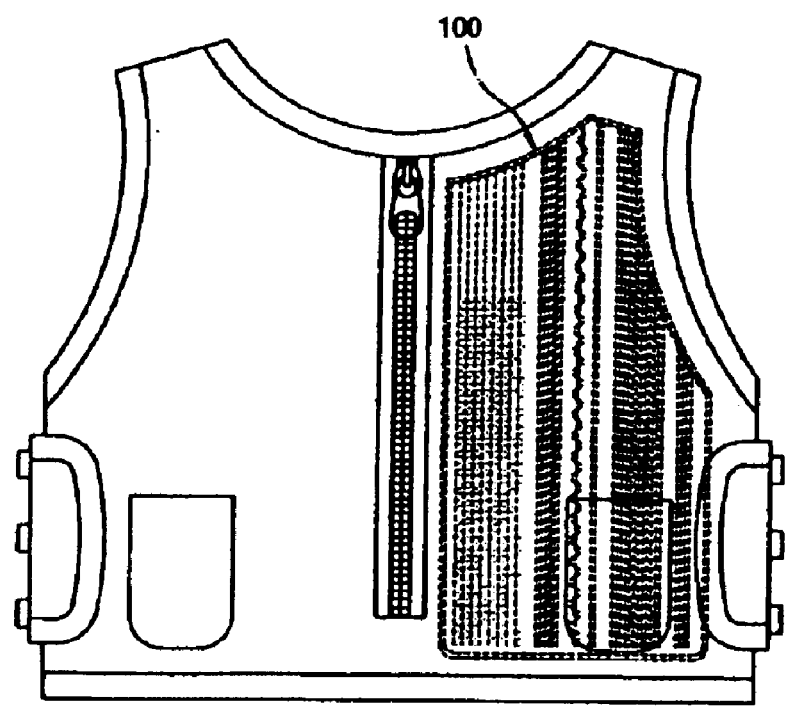

STABPROOF AND BULLETPROOF PANEL

BACKGROUND OF THE INVENTION

1. Field of the Invention

The present invention relates generally to stabproof and bulletproof jackets. In particular, the present invention relates to a stabproof and bulletproof panel, which is constructed in such a way that a plurality of stabproof panels for protecting the body of a user from bladed weapons, such as a knife, a machete, a stiletto and switch-blade, are attached to the front surface of a bulletproof panel for protecting the body from the bullets of firearms, such as a pistol and a rifle, thereby allowing the panel to have both stabproof and bulletproof functions.

2. Description of the Prior Art

In general, a bulletproof jacket for protecting the body from bullets is basically comprised of a garment, a bulletproof panel, and a panel covering. In general, a stabproof jacket is basically comprised of a garment, a stabproof panel, and a plate covering. The bulletproof panel, which is the principal element of a bulletproof jacket, is generally manufactured in conformity with a standard (NIJ STANDARD-0101.03) for testing bulletproof jackets established by the National Institute of Justice (NIJ), U.S. Department of Justice. It is generally tested by a test organization affiliated with the NIJ, such as H. P. White Laboratory Inc. to determine whether a bulletproof panel has been manufactured in conformity with these standards or not.

A variety of stabproof jackets and a variety of stoneproof jackets are manufactured to protect the body from bladed weapons, such as a knife, a machete, a stiletto and switch-blade. Korean Utility Model Publication No. 91-5180 discloses a stoneproof vest, in which many folds of carbon fiber cloths are interposed between outer and inner covers, and a protective panel formed by bonding two protective fabrics 10 to the upper and lower surfaces of a rubber plate 11 or fiber reinforced plastic plate is inserted into a space between each neighboring carbon fiber cloths. This stoneproof vest is easily manufactured, is easily bent, and allows a wearer to be moved. However, this stoneproof vest causes the movement of the body to be inconvenient owing to the weight of rubber plates, and this inconvenience is increased owing to the weight of protective fabrics attached to the rubber plates. Korean Utility Model Unexamined Publication No. 91-009505, as shown in FIG. 2, discloses a protective vest, in which a vest body "A" having neck and arm openings 23 and 24 and reinforcing strips 25 is formed by two protective plates 21 and 22, a woven stretch fabric is attached to the lower end of the vest body "A", and a plurality of protective pieces are attached to the woven stretch fabric while being overlapped at their edges. The prior art protective vest can protect the body of a user from the sharp blade of a bladed weapon when the sharp blade is brought into contact with the large protective plates 21 and 22 of the vest body "A". However, the small protective pieces 27 are attached to the woven stretch fabric 26, so two neighboring protective pieces 27 are widened to form a space therebetween and the sharp blade slips on the protective pieces 27 into the space when the sharp blade is brought into contact with the small protective pieces 27, thereby allowing the shape blade to pierce into the body and the body to be damaged. Additionally, when the sharp blade is upwardly brought into contact with the stretch fabric, the sharp blade pierces into the body and seriously damages the body while the small protective pieces 27 are raised up.

There are disclosed a variety of stabproof panels for protecting the body from the blade of a bladed weapon and a variety of bulletproof panels for protecting the body from bullets fired from a firearm. The stabproof panels can protect the body from the sharp-edged blade of a bladed weapon, but cannot protect the body from bullets rapidly projected from a firearm. On the other hand, the bulletproof panels can protect the body from bullets rapidly projected from a firearm, but cannot protect the body from the sharp-edged blade of a bladed weapon and. However, there is not disclosed a stabproof and bulletproof jacket for both protecting the body from both the sharp-edged blade of a bladed weapon and bullets rapidly projected from a firearm. Accordingly, one of the stabproof jacket and the bulletproof jacket is utilized separately from the other in accordance with circumstances or purposes. As a result, when a firearm and a bladed weapon are simultaneously used, its user is jeopardized while performing his duty.

In order to solve the problems, the assignee of the present patent application filed Korean Pat. Appln. No. 1999-0007174. This patent application discloses a bulletproof panel for bulletproof jackets, which is manufactured in conformity with a standard (NIJ STANDARD-0101.03) for testing bulletproof jackets established by the NIJ, U.S. Department of Justice which is certified by a test organization affiliated with the NIJ, such as H. P. White Factory Inc. as shown in table 1. As shown in FIG. 4, the assignee of the present patent application discloses a bulletproof panel for bulletproof jackets, which is comprised of a front plate 45, a plurality of high density polyethylene films 44 stacked with one on top of another for dispersing impact energy, and a rear plate 46 formed by sewing together a plurality of aromatic polyamide woven fabrics 46 for minimizing frictional heat and deformation, the front plate 45 consisting of a plurality of aromatic polyamide woven fabrics 41, a felt 50 formed by forcibly inserting thin aromatic polyamide fibers or high density polyethylene fibers and a shock-absorbing member 51 into a scrim 52 woven in the form of a net using aromatic polyamide fibers or high density polyethylene yarn, and a plurality of aromatic polyamide woven fabrics 43.

TABLE 1

| | Aromatic polyamide woven fabric (100%) | High-density polyethylene (100%) | Previously filed bulletproof panel of assignee |
|---|---|---|---|
| NIJ standard Field of use and certification | IIIA police H. P. White Laboratory Inc. test, NIJ | IIIA special force recommendation of DMS Co. (manufacturer of law materials) self test of special force | IIIA police, special force H. P. White Laboratory Inc. test, NIJ |
| Manufacturing method | Dupont Co. A363F 36 folds (for police standard) A363F 1. mass: 208 g/m² 2. density: 28 × 28 (fly/inch) | DSM Co. SB2 34 folds (for special force) SB2 1. mass: 160 g/m² 2. density: film | Self-development 25 folds (for police and special force) PARA-ARAMID 1. mass: 220 g/m² 2. density: 30 × 30 (fly/inch) SB2: 160 g/m² PARA-ARAMID |

TABLE 1-continued

|  | Aromatic polyamide woven fabric (100%) | High-density polyethylene (100%) | Previously filed bulletproof panel of assignee |
|---|---|---|---|
| Mass (Kg/m$^2$) | 36 folds × 208 g/m$^2$ = 7.49 | 34 folds × 160 g/m$^2$ = 5.44 | Felt: 613 g/m$^2$ (1 fold) 12 folds × 220 g/m$^2$ = 2.62 12 folds × 160 g/m$^2$ = 1.92 1 fold × 613 g/m$^2$ = 0.61 |
| Weight | 7.49/5.17 × 100 = 144.9%, about 45% heavier than previously filed panel | 5.44/5.17 × 100 = 105.2%, about 5% heavier than previously filed panel | 5.17 100% (reference), lightest |
| Thickness | previously filed panel is thinnest | | |
| Feeling of comfort on wearing | good feeling of wearing because previously filed panel is thinnest and softest | | |
| Cost | average | somewhat expensive | inexpensive |

However, the prior art bulletproof panel filed with Korea Industrial Property Office by the assignee of the present patent application is capable of protecting the body from bullets, but cannot protect the body from a sword or spear having a sharp end.

In general, a stabproof jacket is basically comprised of a garment, a stabproof panel, and a panel covering. The stabproof panel, which is the principal element of the stabproof jacket, is generally manufactured in conformity with a standard (NIJ STANDARD-0115.00) for testing bulletproof jackets established by the NIJ, U.S. Department of Justice. It is generally tested by a test organization affiliated with the NIJ, such as H. P. White Laboratory Inc. to determine whether the bulletproof panel has been manufactured in conformity with these standards or not.

For reference, NIJ STANDARD-0115.00 is explained in the following description. Stabproof jackets covered by this standard are classified into one of two distinct protection classes depending upon the type of threat environment. Within each threat protection class, the jacket is further classified into one of three protection levels. The levels of protection indicate the stab energy the vest is expected to satisfactorily handle. The classification of a jacket panel that provides two or more levels of protection at different locations on the panel shall be that of the minimum protection provided at any location on the panel.

Level 1 stabproof jacket: a low-level protection jacket suitable for extended wear and generally consealable Level 2 stabproof jacket: a general duty garment suitable for extended wear Level 3 stabproof jacket: a high-level protection jacket suitable for wear in high risk situations The stabproof jacket should afford protection against injury from penetration by knives, edged weapons, and sharp-pointed weapons while ensuring that the movement of the wearer is not unduly restricted.

There are two protection classes defined in this standard. One is intended to deal with threats that might be expected on the street from high quality. Commercially machined edged knife blades. This class is referred to as the "Edged Blade" class. The other protection class is intended to deal with threats that might be expected in a corrections environment. Lower quality knife blades and spike style weapons that have been improvised from other materials typically characterize these threats. This class is referred to as the "Spike" class.

The three levels of protection presented in this standard were derived from a 1997–1999 PSDB program where the frequency distribution of the energy that can be delivered by a male population using several stabbing techniques was characterized. The lowest energy level corresponds of the 85%, the next energy level corresponds to the 90%, and the highest energy level corresponds to the 96%.

For any given protection level, the test protocol requires the knife blade or spike to impact the test sample at two distinct energy levels. The first energy level, called "E1," corresponds to the percentages described above. At this condition, a maximum blade or spike penetration of 7 mm is allowable. The penetration limit was determined through research indicating that internal injuries to organs would be extremely unlikely at 7 mm of penetration. The test protocol then requires an overtest condition where the knife blade or spike kinetic energy is increased by 50%. At this higher energy condition, called "E2", a maximum blade or spike penetration of 20 mm is allowable. This overtest is required to ensure that there is an adequate margin of safety in the stabproof jacket design.

TABLE 2

| Protection level | "E 1" Strike Energy (ft-lbf) | "E 2" Overtest Strike Energy (ft-lbf) |
|---|---|---|
| 1 | 17.7 ± 0.36 | 26.6 ± 0.44 |
| 2 | 24.3 ± 0.44 | 36.9 ± 0.51 |
| 3 | 31.7 ± 0.44 | 47.9 ± 0.59 |

In the design of the bulletproof panel and the stabproof panel, protection capability against a bullet or blade should be superior, and the deformation of a panel should be considered to prevent the rearward deformation of the panel from damaging a user. Additionally, the panels should fulfill various requirements that the panels should be lightweight, give a feeling of comfort on wearing to a wearer and be inexpensive.

SUMMARY OF THE INVENTION

Accordingly, the present invention has been made keeping in mind the above problems occurring in the prior art, and an object of the present invention is to provide a bulletproof and stabproof panel, in which a plurality of stabproof panels are attached to the front surface of a bulletproof panel, thereby protecting the body from both bullets and swords.

In order to accomplish the above object, the present invention provides a stabproof and bulletproof panel, comprising: a bulletproof panel comprised of a front plate consisting of a plurality of aromatic polyamide woven fabrics, a felt formed by forcibly inserting thin aromatic polyamide fibers or high density polyethylene fibers and a shock-absorbing member into a scrim woven in the form of a net using aromatic polyamide fibers or high density polyethylene yarn, and a plurality of aromatic polyamide woven fabrics, a plurality of high density polyethylene films stacked with one on top of another for dispersing impact energy, and a rear plate formed by sewing together a plurality of aromatic polyamide woven fabrics for minimizing frictional heat and deformation; and five to twelve stabproof panels brought into tight contact with the front surface of the bulletproof panel.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view showing a conventional stabproof panel;

FIG. 2 is a perspective view showing a conventional stabproof jacket and stabproof pieces thereof;

FIG. 3 is a diagram showing a process in which a bullet is stopped by a bulletproof panel while the impact of the bullet is absorbed by the bulletproof panel;

FIG. 4 is a sectional view showing the stack structure of a bulletproof panel;

FIG. 5 is a perspective view showing a felt constituting an element of the bulletproof panel of FIG. 4;

FIG. 6 is a longitudinal sectional view showing a stabproof panel of the present invention;

FIG. 7 is a view showing the deformation of a plurality of tightly overlapped stabproof panels when a blade pierces the stabproof panels;

FIG. 8 is a view showing the stack of a stabproof and bulletproof panel in which a plurality of stabproof panels are attached to the front surface of a bulletproof panel; and FIG. 9 is a front view showing a stabproof and bulletproof jacket in which the stabproof and bulletproof panel enclosed in a panel covering is inserted into a panel pocket in a garment.

DESCRIPTION OF THE PREFERRED EMBODIMENTS

Reference now should be made to the drawings, in which the same reference numerals are used throughout the different drawings to designate the same or similar components.

As shown in FIGS. 4 and 8, a stabproof and bulletproof panel in accordance with the present invention is comprised of a bulletproof panel 40 and a plurality of stabproof panels 60. The bulletproof panel 40 is comprised of a front plate 45, a plurality of high density polyethylene films 44 stacked with one on top of another for dispersing impact energy, and a rear plate 46 formed by sewing together a plurality of aromatic polyamide woven fabrics for minimizing frictional heat and deformation. The front plate 45 consists of a plurality of aromatic polyamide woven fabrics 41, a felt 50 formed by forcibly inserting thin aromatic polyamide fibers or high density polyethylene fibers and a shock-absorbing member 51 into a scrim 52 woven in the form of a net using aromatic polyamide fibers or high density polyethylene yarn, and a plurality of aromatic polyamide woven fabrics 43. The stabproof panels 60 are brought into tight contact with the front surface of the bulletproof panel 40.

A preferred embodiment of the present invention is described in detail with reference to FIGS. 3 to 9.

FIG. 3 is a diagram showing a process in which a bullet is stopped by a bulletproof panel while the impact of the bullet is absorbed by the bulletproof panel. FIG. 4 is a sectional view showing the stack structure of a bulletproof panel. FIG. 5 is a perspective view showing a felt constituting an element of the bulletproof panel of FIG. 4. FIG. 6 is a longitudinal sectional view showing a stabproof panel of the present invention. FIG. 7 is a view showing the deformation of a plurality of overlapped stabproof panels when a blade pierces the stabproof panels. FIG. 8 is a view showing the stack of a stabproof and bulletproof panel in which a plurality of stabproof panels are attached to the front surface of a bulletproof panel. FIG. 9 is a front view showing a stabproof and bulletproof jacket in which the stabproof and bulletproof panel enclosed in a panel covering is inserted into a panel pocket in a garment.

Of the drawings, FIG. 3 is a diagram showing a process in which a bullet is stopped by a bulletproof panel while the impact of the bullet is absorbed by the bulletproof panel. When a bullet 30 fired from a rifle and heated by friction with air reaches a bulletproof panel 31, the advance of the bullet 30 is restricted by the bulletproof panel 31 and the bullet 30 is gradually flattened as shown in the drawing, thereby halting the advance of the bullet 30. Accordingly, the bulletproof panel 31 should absorb impact energy efficiently, bear up against a high temperature, and have sufficient tensile strength to minimize its deformation and, thereby, prevent the body from being damaged by the deformation of the bulletproof panel 31.

FIGS. 4 and 5 are views showing a bulletproof panel previously filed with Korea Industrial Property Office by the assignee of the present patent application. The bulletproof panel is comprised of a front plate 45, a plurality of high density polyethylene films 44 stacked with one on top of another for dispersing impact energy, and a rear plate 46 formed by sewing together a plurality of aromatic polyamide woven fabrics for minimizing frictional heat and deformation. The front plate 45 consists of a plurality of aromatic polyamide woven fabrics 41, a felt 50 formed by forcibly inserting thin aromatic polyamide fibers or high density polyethylene fibers and a shock-absorbing member 51 into a scrim 52 woven in the form of a net using aromatic polyamide fibers or high density polyethylene yarn, and a plurality of aromatic polyamide woven fabrics 43.

The characteristics of the felt 50 are shown in table 3.

TABLE 3

| | Aromatic polyamide | High density polyethylene | Present invention |
|---|---|---|---|
| Weight | 600 g/m² or more | 400 g/m² or more | 400 to 600 g/m² or more |
| Thickness | 3 mm or more | 3 mm or more | 3 to 3.5 mm |
| Tensile strength | 280 Kg or more | 350 Kg or more | 280 to 350 Kg |
| Density | | 11 × 7 | |

FIG. 6 is a longitudinal sectional view showing a stabproof panel 60 of the present invention. The stabproof panel 60 is constructed by spreading resinous bonding agent 61 on one surface of an aromatic polyamide woven fabric 41, high density polyethylene woven fabric or similar high strength woven fabric and, thereafter, projecting sands 62, each of which has a particle size corresponding to the particle size of a No. 100 to 500 sand paper, to the resinous bonding agent 61 to densely bond sands 62 on the surface.

The stabproof panel 60 is composed of 60 to 65 wt % of the aromatic polyamide woven fabric 41, a high density polyethylene woven fabric or a similar high strength woven fabric, 1 to 2 wt % of the resinous bonding agent 61 and 35 to 40 wt % of the sands. The physical characteristics of the stabproof panel 60 tested by FITI Testing & Research Institute, or a test organization certified by the Korean government, are shown in table 4.

TABLE 4

| Test items (Korean standards) | Test results | Remarks |
|---|---|---|
| Composition (KS K 0210) | 100% aromatic polyamide fiber | test method: quantitative composition, FTIR method only woven fabric tested except for resin |
| Resin discrimination (KS K0210) | inorganic material, synthetic rubber, acrylic resin | test method; FTIR method |
| Ash (KS K0215) | 38.7% | |
| Density (KS K0511) | warp: 55.2 weft: 50.2 | standard: ply/5 cm |
| Weight (KS K0511) | 423.4 g/m$^2$ | |
| Tensile strength (KS K0520) | warp: 474.6 weft: 317.9 | test method: C.R.E. strip method standard: kgf/2.5 cm |

FIG. 7 is a view showing the deformation of a plurality of tightly overlapped stabproof panels 60 when a blade pierces the stabproof panels. When a blade "B" reaches the stabproof panels 60, impact energy generated by the piercing of the blade "B" is immediately transmitted to the stabproof panels 60. In particular, while enormous pushing power generated by concentrated load at the point of the blade "B" is transmitted to the stabproof panels 60, the power is weakened by the stabproof panels 60. As the pushing power is weakened by the stabproof panels 60, the point of the blade "B" is blunted by the stabproof panels 60 in the rear panels of the stabproof panels 60. The stabproof function of the stabproof panels 60 against the blade "B" is similar to the bulletproof function of the bulletproof panel 40 against a bullet.

The stabproof and bulletproof panel 100 of the present invention, as illustrated in FIG. 8, is constructed by bringing five to twelve stabproof panels into tight contact with one another and positioning the bulletproof panel 40 in back of the stabproof panels 60. Although not shown, the stabproof and bulletproof panel 100 is enclosed in a covering envelope. As shown in FIG. 9, the stabproof and bulletproof panel 100 is utilized while the covering envelope containing the stabproof and bulletproof panel 100 is inserted into the panel holding portion of the garment of a stabproof and bulletproof jacket.

As a result of performance tests performed by H. P. White Laboratory Inc. in accordance with an internationally certified test standard (NIJ STANDARD-0115.00) for testing bulletproof jackets established by the National Institute of Justice (NIJ), U.S. Department of Justice, the stabproof and bulletproof panel 100 of the present invention fulfilled the NIJ standard (see Report Nos. 8245-03A, 8245-03B and 8245-03C of H. P. White Laboratory Inc.).

As described above, the present invention provides a bulletproof and stabproof panel, which has a superior feeling of comfort on wearing and is both bulletproof and stabproof.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A stabproof and bulletproof panel, comprising:

a bulletproof panel comprised of, a front plate consisting of, a plurality of aromatic polyamide woven fabrics, a felt formed by forcibly inserting the aromatic polyamide fibers or high density polyethylene fibers and a shock-absorbing member into a scrim woven in the form of a net using aromatic polyamide fibers or high density polyethylene yarn, and a plurality of aromatic polyamide woven fabrics, a plurality of high density polyethylene films stacked with one on top of another for dispersing impact energy, and a rear plate formed by sewing together a plurality of aromatic polyamide woven fabrics for minimizing frictional heat and deformation; and five to twelve stabproof panels brought into tight contact with the front surface of said bulletproof panel.

2. The stabproof and bulletproof panel according to claim 1, wherein said stabproof panel is constructed by spreading a resinous bonding agent on one surface of an aromatic polyamide woven fabric, high density polyethylene woven fabric or similar high strength woven fabric and, thereafter, projecting sands, each of which has a particle size corresponding to the particle size of a No. 100 to 500 sand paper, to the resinous bonding agent to densely bond sands on the surface.

3. The stabproof and bulletproof panel according to claim 2, wherein said stabproof panel is composed of 60 to 65 wt % of the aromatic polyamide woven fabric, high density polyethylene woven fabric or similar high strength woven fabric, 1 to 2 wt % of the resinous bonding agent and 35 to 40 wt % of the sands.

\* \* \* \* \*